US012718338B2

(12) United States Patent
Jeong et al.

(10) Patent No.: US 12,718,338 B2
(45) Date of Patent: Aug. 25, 2026

(54) IMAGE SIGNAL PROCESSOR SUPPORTING COMPENSATION OPERATION FOR SATURATED PIXEL AND METHOD OF OPERATING THE SAME

(71) Applicant: Samsung Electronics Co., Ltd., Suwon-si (KR)

(72) Inventors: Seongyeong Jeong, Suwon-si (KR); Seongwook Song, Suwon-si (KR); Geunyoung Lee, Suwon-si (KR); Jongmin You, Suwon-si (KR); Jeongguk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 18/491,125

(22) Filed: Oct. 20, 2023

(65) Prior Publication Data

US 2024/0147081 A1 May 2, 2024

(30) Foreign Application Priority Data

Oct. 27, 2022 (KR) ........................ 10-2022-0140370

(51) Int. Cl.
*G06T 5/92* (2024.01)
*G06T 7/90* (2017.01)

(52) U.S. Cl.
CPC . *G06T 5/92* (2024.01); *G06T 7/90* (2017.01)

(58) Field of Classification Search
CPC .................................... G06T 7/90; G06T 5/92
USPC .................................................. 382/162, 167
See application file for complete search history.

(56) References Cited

U.S. PATENT DOCUMENTS

| | | | |
|---|---|---|---|
| 8,081,242 | B2 | 12/2011 | Shiraishi |
| 8,842,912 | B2 | 9/2014 | Lukac et al. |
| 9,294,688 | B2 | 3/2016 | Ju et al. |
| 10,070,109 | B2 | 9/2018 | Lim et al. |
| 10,412,356 | B2 | 9/2019 | Eto |

(Continued)

FOREIGN PATENT DOCUMENTS

| | | | |
|---|---|---|---|
| JP | 5123137 | B2 | 11/2012 |
| JP | 5803233 | B2 | 9/2015 |

*Primary Examiner* — Jamares Q Washington
(74) *Attorney, Agent, or Firm* — Wolf, Greenfield & Sacks, P.C.

(57) ABSTRACT

An image signal processor configured to receive a digital signal from an image sensor includes a saturation detecting unit configured to classify each of a plurality of pixels, corresponding to the digital signal, as either a saturated pixel or a non-saturated pixel and to select a compensable pixel among the saturated pixels, a color processing unit configured to estimate channel values for each color for each of the plurality of pixels corresponding to the digital signal and to perform a correlation calculation between the channel values for each color, and a saturation compensation unit configured to select at least one color-transfer pixel, among the non-saturated pixels, based on the correlation calculation value between the channel values for each color and to perform a compensation operation on the compensable pixel based on the at least one color-transfer pixel. The image signal processor may recover information, lost due to saturation, through a color-transfer method using a correlation between colors. Accordingly, a dynamic range may be extended.

20 Claims, 18 Drawing Sheets

(56) References Cited

U.S. PATENT DOCUMENTS

2011/0305388 A1* 12/2011 Wedi .......................... G06T 5/50
382/165
2018/0374240 A1* 12/2018 Zhang ........................ G06T 7/90

* cited by examiner 200
210
Saturation Detecting Unit
220
Color Processing Unit
221
Color Estimation Module
222
Color Correlation Calculation Module
230
Saturation Compensation Unit
DS
C_DS

FIG. 3A

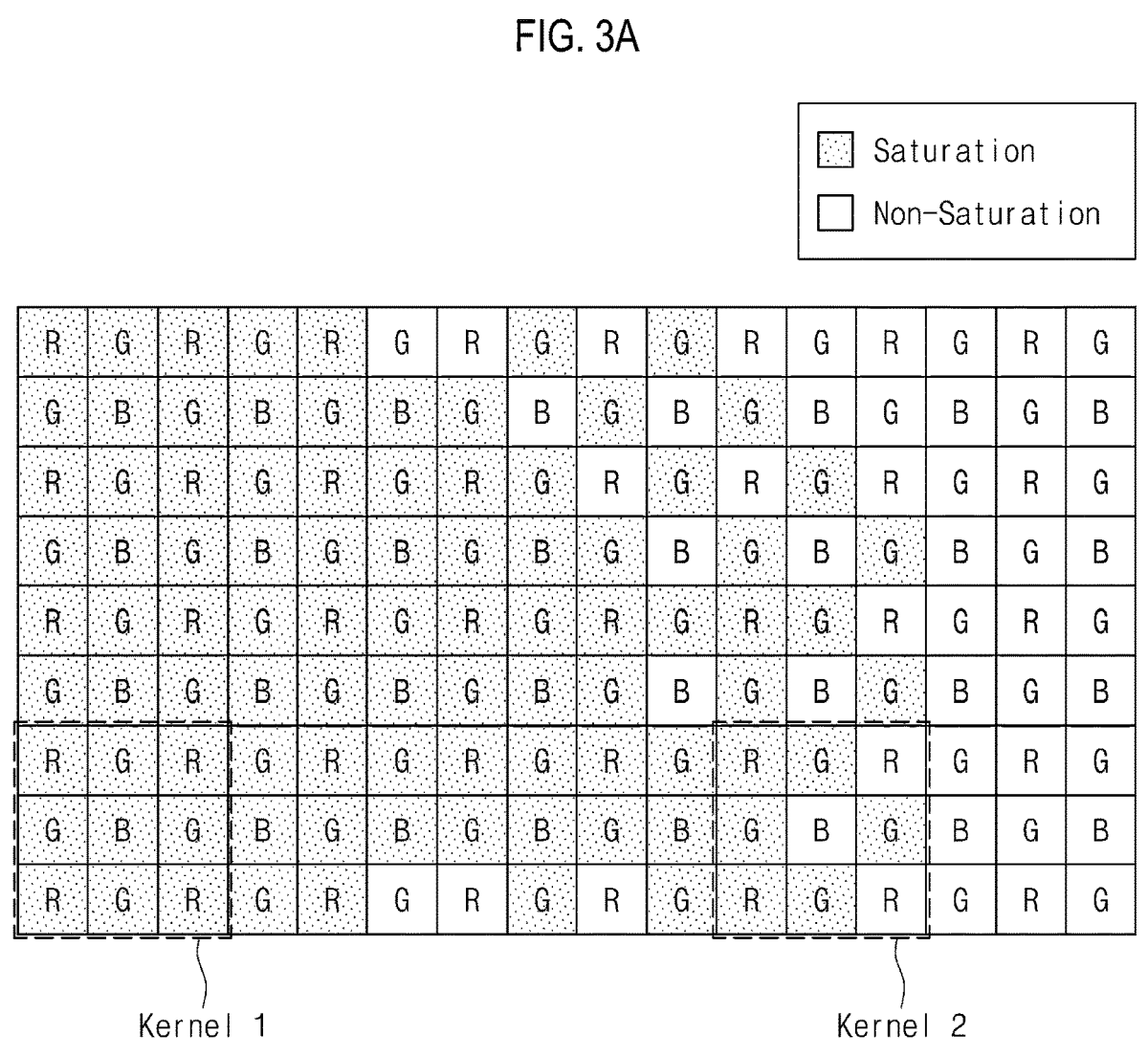

Saturation
Non-Saturation

| R | G | R | G | R | G | R | G | R | G | R | G | R | G | R | G |
|---|---|---|---|---|---|---|---|---|---|---|---|---|---|---|---|
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |

Kernel 1

Kernel 2

FIG. 3B

Bayer Pattern

Non-Saturation Area or Non-Compensable Area

Compensable Area

Flag Map

[Single Frame]

FIG. 10

IMAGE SIGNAL PROCESSOR SUPPORTING COMPENSATION OPERATION FOR SATURATED PIXEL AND METHOD OF OPERATING THE SAME

CROSS-REFERENCE TO RELATED APPLICATION(S)

This application claims benefit of priority to Korean Patent Application No. 10-2022-0140370 filed on Oct. 27, 2022, in the Korean Intellectual Property Office, the disclosure of which is incorporated herein by reference in its entirety.

BACKGROUND

The present disclosure relates to an image signal processor and a method of operating the same.

When an image sensor has a narrow dynamic range, a color digital image obtained by an image sensor may not accurately represent an actual color of a subject. In particular, a red (R) channel, a green (G) channel, and a blue (B) channel corresponding to each pixel of the image sensor may be saturated to be different for each channel, and a digital signal corresponding to a saturated channel may be limited to a maximum code. For example, the digital signal corresponding to the saturated channel may be clipped to a maximum code or a value similar thereto. For this reason, the color corresponding to the saturated pixel may be distorted to be different from an original color, and loss of detailed information may occur. Accordingly, there is a need for a technology to recover information lost due to saturation of a pixel.

SUMMARY

Example embodiments provide an image signal processor for recovering information lost due to saturation of a pixel.

According to an example embodiment, an image signal processor configured to receive a digital signal from an image sensor includes: a saturation detecting unit configured to classify each of a plurality of pixels, corresponding to the digital signal, as either a saturated pixel or a non-saturated pixel and to select a compensable pixel among the saturated pixels; a color processing unit configured to estimate channel values for each color for each of the plurality of pixels corresponding to the digital signal and to perform a correlation calculation between the channel values for each color; and a saturation compensation unit configured to select at least one color-transfer pixel, among the non-saturated pixels, based on the correlation calculation value between the channel values for each color and to perform a compensation operation on the compensable pixel based on the at least one color-transfer pixel.

According to an example embodiment, a method of operating an image signal processor includes: comparing an image data value for each of a plurality of unit pixels with a saturation threshold value to detect saturated pixels among the plurality of unit pixels; estimating channels for each of the plurality of unit pixels; performing a correlation calculation on some channels selected from among channels for each of the plurality of unit pixels; and selecting at least one color-transfer pixel from among non-saturated pixels of the plurality of unit pixels based on a result value of the correlation calculation, and performing a compensation operation on a target pixel of the plurality of unit pixels using the at least one color-transfer pixel.

According to an example embodiment, an electronic device including an image sensor includes: a saturation detecting unit configured to classify each of a plurality of pixels, corresponding to a digital signal output from the image sensor, as either a saturated pixel or a non-saturated pixel and to select a compensable pixel from among the saturated pixels; a color processing unit configured to estimate channel values for each color for each of a plurality of pixels and to perform a correlation calculation between the channel values for each color; and a saturation compensation unit configured to select at least one color-transfer pixel from among the non-saturated pixels based on the correlation calculation value between the channel values for each color and to perform a compensation operation on the compensable pixel based on the at least one color-transfer pixel.

BRIEF DESCRIPTION OF DRAWINGS

The above and other aspects, features, and advantages of the present disclosure will be more clearly understood from the following detailed description, taken in conjunction with the accompanying drawings.

FIGS. 3A and 3B are diagrams that illustrate an operation of a saturation detecting unit of FIG. 2.

FIG. 6 is a flowchart illustrating an example of operations of the image signal processor of FIG. 2.

FIG. 7 is a flowchart illustrating an example of the compensation operation of FIG. 6.

FIGS. 9 to 11 are diagrams illustrating examples in which the image signal processor according to an example embodiment is applied to a single frame, multiple frames, and a multi-sample high dynamic range (HDR).

DETAILED DESCRIPTION

Figure 1:
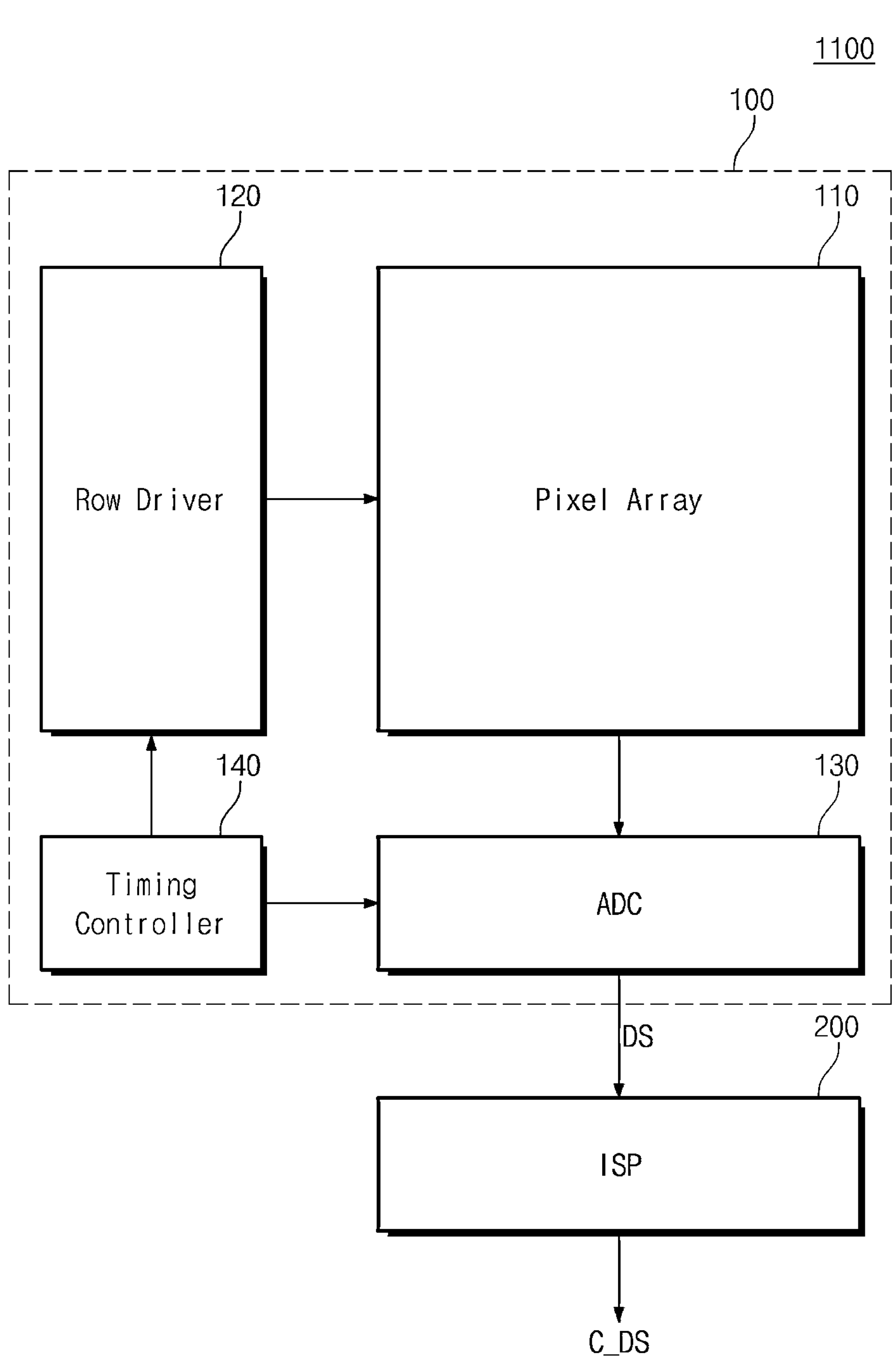
FIG. 1 is a block diagram illustrating an example of an image processing device according to an example embodiment.

Hereinafter, example embodiments will be described with reference to the accompanying drawings. The same reference numerals are used for the same components in the drawings, and duplicate descriptions thereof are omitted. As used herein, the term “and/or” includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram illustrating an example of an image processing device 1100 according to an example embodiment.

Referring to FIG. 1, the image processing device 1100 may include an image sensor 100 and an image signal processor (ISP) 200. The image sensor 100 may include a pixel array 110, a row driver 120, an analog-to-digital converter 130, and a timing controller 140. The image sensor 100 and the image signal processor 200 may be integrated into a single monolithic chip, or may be implemented as individual chips.

The pixel array 110 may be configured to generate a plurality of pixel signals (for example, analog pixel signals) based on incident light. The pixel array 110 may include a plurality of unit pixels arranged in a matrix of a plurality of rows and a plurality of columns. The unit pixels may have an appropriate pattern for sensing a color image. For example, the unit pixels may be monochrome pixels sensing a range of visible light wavelengths, and each of the unit pixels may be coupled to one of a read (R) filter, a green (G) filter, and a blue (B) filter. In typical complementary metal-oxide semiconductor (CMOS) and charge-coupled device (CCD) image sensors, R, G, and B filters may be arranged in a predetermined array pattern. For example, the R, G, and B filters may be arranged in a Bayer pattern. In this case, the image sensor 100 may provide RGB Bayer image data that one of R, G, and B color values matches in each of the unit pixels.

The row driver 120 may be connected to each row of the pixel array 110 and may be configured to generate a driving signal driving each row. For example, the row driver 120 may drive a plurality of unit pixels, included in the pixel array 210, in units of rows.

The analog-to-digital converter 130 may be connected to each column of the pixel array 110 and may be configured to convert an analog signal, output from the pixel array 110, into a digital signal. As an example, the analog-to-digital converter 130 may include a plurality of analog-to-digital converters and may be configured to convert analog signals, output for each column line, into digital signals in parallel. As another example, the analog-to-digital converter 130 may include a single analog-to-digital converter and may sequentially convert the analog signals into digital signals.

The timing controller 140 may be configured to control the row driver 120 and the analog-to-digital converter 130. The timing controller 140 may be configured to provide control signals, such as a clock signal and a timing control signal, used for an operation of the row driver 120 and the analog-to-digital converter 130. For example, the timing controller 140 may include a logic control circuit, a phase lock loop (PLL) circuit, a timing control circuit, and a communication interface circuit.

The image signal processor 200 may be configured to receive a digital signal, provided from the image sensor 100, and may be configured to perform image data processing on the digital signal. For example, the image signal processor 400 may be configured to perform image interpolation, color correction, white balance, gamma correction, color conversion, or the like.

The image signal processor 200 according to embodiments of the present disclosure may be configured to recover information, lost due to saturation, through a color-transfer method using a correlation between colors. For example, the image signal processor 200 may be configured to classify the unit pixels of the pixel array 110 into saturated pixels and non-saturated pixels, and may be configured to select a target pixel in which lost information may be at least partially recovered, among the saturated pixels. The image signal processor 200 may be configured to select at least one pixel, having a color similar to a color of a target pixel to be compensated for, among a plurality of non-saturated pixels, using a correlation between colors and may be configured to compensate for the target pixel using color information corresponding to the selected at least one pixel. Thus, information of the target pixel, lost due to saturation, may be at least partially recovered and a dynamic range may be extended.

Figure 2:
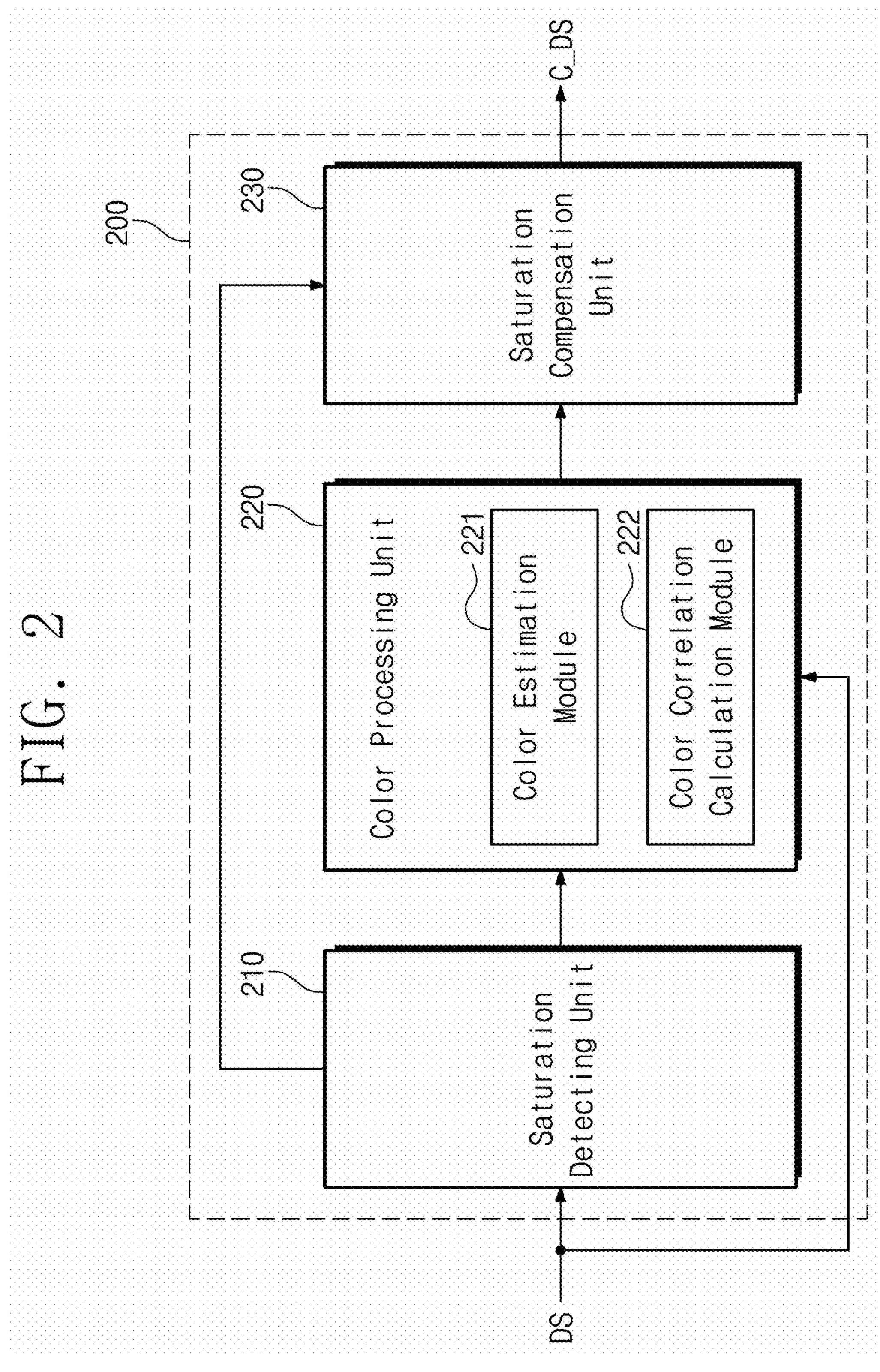
FIG. 2 is a block diagram illustrating an example of an image signal processor of FIG. 1.

FIG. 2 is a block diagram illustrating an example of the image signal processor 200 of FIG. 1.

Referring to FIG. 2, the image signal processor 200 may be configured to receive a digital signal DS and may be configured to recover information, lost due to saturation, to output a compensated digital signal C_DS. The image signal processor 200 may include a saturation detecting unit 210, a color processing unit 220, and a saturation compensation unit 230.

The saturation detecting unit 210 may be configured to receive the digital signal DS. The digital signal DS may include a plurality of pieces of image data for each of the plurality of unit pixels included in the pixel array 110 (see FIG. 1). The saturation detecting unit 210 may be configured to compare a saturation threshold value Tsat with each of the plurality of pieces of image data to determine whether each of the unit pixels is saturated.

For example, in an 8-bit image, the saturation threshold value Tsat may be set to "256" or less. For example, when the saturation threshold value Tsat is set to "235," the saturation detecting unit 210 may determine a unit pixel corresponding to image data having a value greater than "235" as a saturated pixel. The term "saturated pixel" may refer to a pixel in which charges generated by a photoelectric conversion element exceeds charge storage capacity of a corresponding unit pixel. For example, when strong light is irradiated, charges exceeding the charge storage capacity may be generated by the photoelectric conversion element. Because the charges exceeding the charge storage capacity are discarded without conversion into pixel signals when pixel signals are generated, a portion of information included in image data corresponding to the saturated pixel may also be lost.

In an example embodiment, the saturation detecting unit 210 may be configured to check whether saturation occurs for each unit pixel. For example, the saturation detecting unit 210 may compare the saturation threshold value Tsat with a value of image data, corresponding to each unit pixel, to determine whether saturation occurs for each unit pixel. In addition, in an example embodiment, the saturation detecting unit 210 may be configured to check whether saturation occurs for each channel. For example, each unit pixel may include a red (R) channel, a green (G) channel, and a blue (B) channel. The saturation detecting unit 210 may compare each of a data value of the R channel, a data value of the G channel, and a data value of the B channel with the saturation threshold value Tsat. When the data value of the R channel, the data value of the G channel, and/or the data value of the B channel is greater than the saturation threshold value Tsat, the saturation detecting unit 210 may determine corresponding unit pixel as a saturated pixel.

The saturation detecting unit 210 may be configured to classify a saturated pixel as either one of a compensable pixel, capable of recovering lost information, and a non-compensable pixel incapable of recovering lost information. For example, the saturation detecting unit 210 may classify saturated pixels into compensable pixels and non-compensable pixels, based on whether a non-saturated pixel having no loss of information is present nearby. For example, by setting a kernel having a predetermined size in the pixel array 110 and determining whether a non-saturated pixel is included in the kernel the saturation detecting unit 210 may classify saturated pixels into compensable pixels and non-compensable pixels. In this case, the size of the kernel may be variously changed in accordance with different embodiments.

The color processing unit 220 may be configured to receive a digital signal DS including image data for each of the plurality of unit pixels. The color processing unit 220 may be configured to perform a color correlation calculation on channels corresponding to each unit pixel. The color processing unit 220 may include a color estimation module 221 and a color correlation calculation module 222.

The color estimation module 221 may be configured to perform an estimation operation of estimating an R channel, a G channel, and a B channel corresponding to each unit pixel. For example, the color estimation module 221 may estimate an R channel, a G channel, and a B channel corresponding to each unit pixel through a de-mosaicing method. However, this is merely an example, and the color estimation module 221 may be configured to perform an estimation operation through a fully directional estimation method, a linear minimum mean square-error estimation (LMMSE) method, or the like.

The color correlation calculation module 222 may be configured to receive information on the R channel, the G channel, and the B channel from the color estimation module 221. The color correlation calculation module 222 may be configured to perform a correlation calculation using two channels, in which there is no, or little loss of information caused by saturation, among the R channel, the G channel, and the B channel. For example, the R channel and the B channel may not be saturated, or a degree of loss of information, caused by saturation, of the R channel and the B channel may be lower than that of the G channel. In this case, the color correlation calculation module 222 may perform a correlation calculation using the R channel and the B channel. The color correlation calculation module 222 may be configured to output a correlation calculation value for each unit pixel as a color correlation map.

The saturation compensation unit 230 may be configured to receive information on non-saturated pixels, information on compensable pixels, and information on non-compensable pixels from the saturation detecting unit 210. The saturation compensation unit 230 may be configured to select a target pixel, on which a compensation operation is to be performed, from among the compensable pixels.

Also, the saturation compensation unit 230 may be configured to receive a color correlation map from the color processing unit 220. The color correlation map may include information on a correlation calculation value for each unit pixel. The saturation compensation unit 230 may be configured to compare a correlation calculation value of the target pixel with a correlation calculation value of the non-saturated pixels through the color correlation map. The saturation compensation unit 230 may be configured to select a color-transfer pixel (hereinafter referred to as a “CT pixel”), on which a color-transfer operation is to be performed, from among the non-saturated pixels, based on similarity between a correlation calculation value of a target pixel and correlation calculation values of non-saturated pixels. The saturation compensation unit 230 may be configured to perform a compensation operation on information, lost due to saturation, using color information of the CT pixel and color information of the target pixel.

In an example embodiment, the saturation compensation unit 230 may be configured to extract first candidate pixels from among the non-compensable pixels, based on the similarity between the correlation calculation value of the target pixel and the correlation calculation values of the non-saturated pixels. Then, the saturation compensation unit 230 may be configured to extract second candidate pixels by excluding pixels, which do belong to the same subject as the target pixel, from among the first candidate pixels. Then, the saturation compensation unit 230 may be configured to select at least one of the second candidate pixels as a CT pixel and may at least partially recover information of a target pixel, lost due to saturation, using the selected CT pixel.

As described above, the image signal processor 200 according to the present disclosure may be configured to recover information, lost due to saturation, through a color-transfer technique using a correlation between a target pixel and non-saturated pixels. In this case, a color correlation calculation value may be calculated by excluding a single channel, having a largest loss caused by saturation, from among the R, G, and B channels.

Figure 3B:
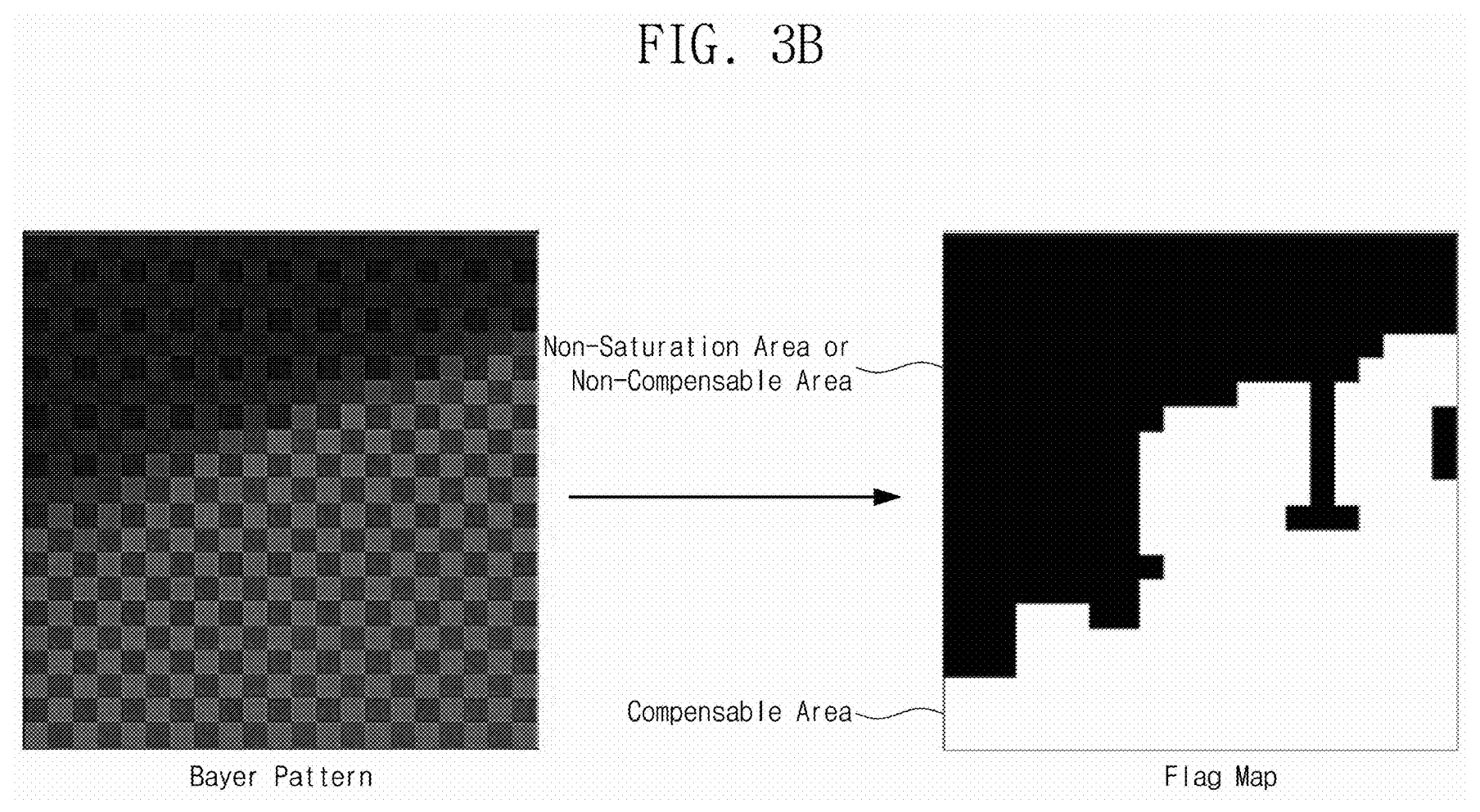

FIGS. 3A and 3B are diagrams that illustrate an operation of the saturation detecting unit 210 of FIG. 2. For example, FIG. 3A illustrates an example of the pixel array 110 in which saturation or non-saturation is determined for each unit pixel. FIG. 3B illustrates an example of extracting a compensable area from the pixel array 110 of a Bayer pattern. For ease of description, a kernel used to determine a compensable area is assumed to have a size of 3×3.

Referring to FIG. 3A, the saturation detecting unit 210 may be configured to compare a value of image data, corresponding to each unit pixel of the pixel array 110, with a saturation threshold value Tsat to classify each unit pixel into saturated pixels and non-saturated pixels. At least one of the non-saturated pixels may be used as a CT pixel in a color-transfer operation described below.

The saturation detecting unit 210 may classify each of the saturated pixels as either a compensable pixel or a non-compensable pixel. For example, the saturation detecting unit 210 may set a kernel including a plurality of pixels, as illustrated in FIG. 3A. For example, the kernel may be set such that a pixel corresponding to a B color is disposed in a center of the kernel.

The saturation detecting unit 210 may be configured to classify saturated pixels into compensable pixels and non-compensable pixels based on whether channels included in the kernel are saturated.

For example, when all pixels are saturated pixels as illustrated in a first kernel kernel1, all pieces of information of an R channel, a G channel, and a B channel in the first kernel may be in a lost state. In this case, the saturation detecting unit 210 may determine that pixels in the first kernel are non-compensable.

As another example, when at least one pixel is a non-saturated pixel as illustrated in a second kernel kernel2, at least some pieces of information of an R channel, a G channel, and a B channel in the second kernel kernel2 may be in a valid state. In this case, channel estimation may be performed using valid information of a non-lost pixel, so that the saturation detecting unit 210 may determine that pixels in the second kernel kernel2 are compensable.

FIG. 3B illustrates an example in which light is irradiated to a pixel array 110 including unit pixels arranged in a Bayer pattern. For example, intensity of irradiated light may be gradually increased in a direction toward a lower right area. In this case, most pixels in areas, to which light having relatively high intensity is irradiated, may be saturated. An area, in which saturated pixels, including one or more compensable pixels are disposed, may be referred to as a compensable area. An area, in which among saturated pixels, only non-compensable pixels are disposed, may be referred to as a non-compensable area. In addition, most pixels in areas, to which light having relatively low intensity is irradiated, may be unsaturated. An area, in which non-saturated pixels are disposed, may be referred to as a non-saturated area. As illustrated in FIG. 3B, the saturation detecting unit 210 may classify unit pixels of the pixel array 110 into a compensable area and the other areas (for example, a non-saturated area and a non-compensable area) and may output the classified areas as a flag map.

Figure 4A:
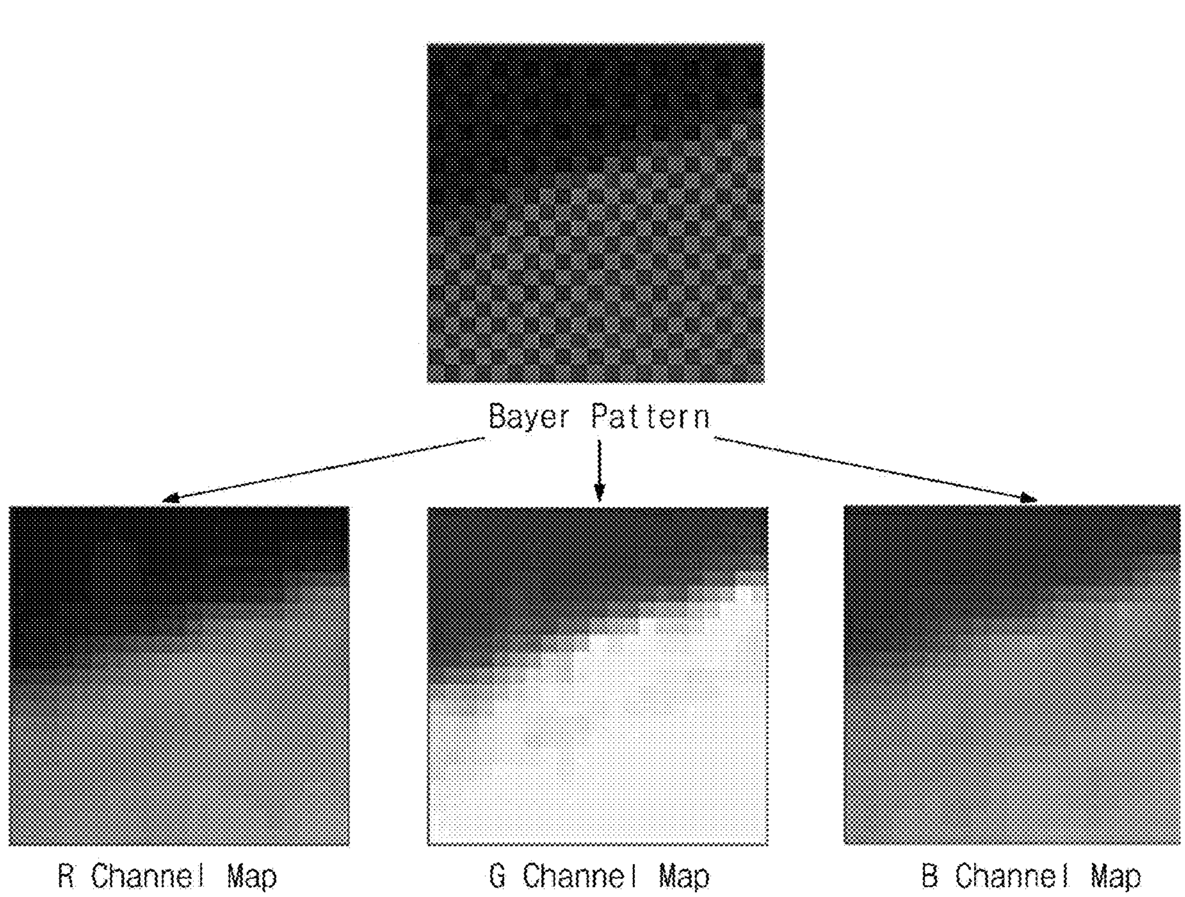
FIGS. 4A and 4B are diagrams that illustrate an operation of a color processing unit of FIG. 2.
Figure 4B:
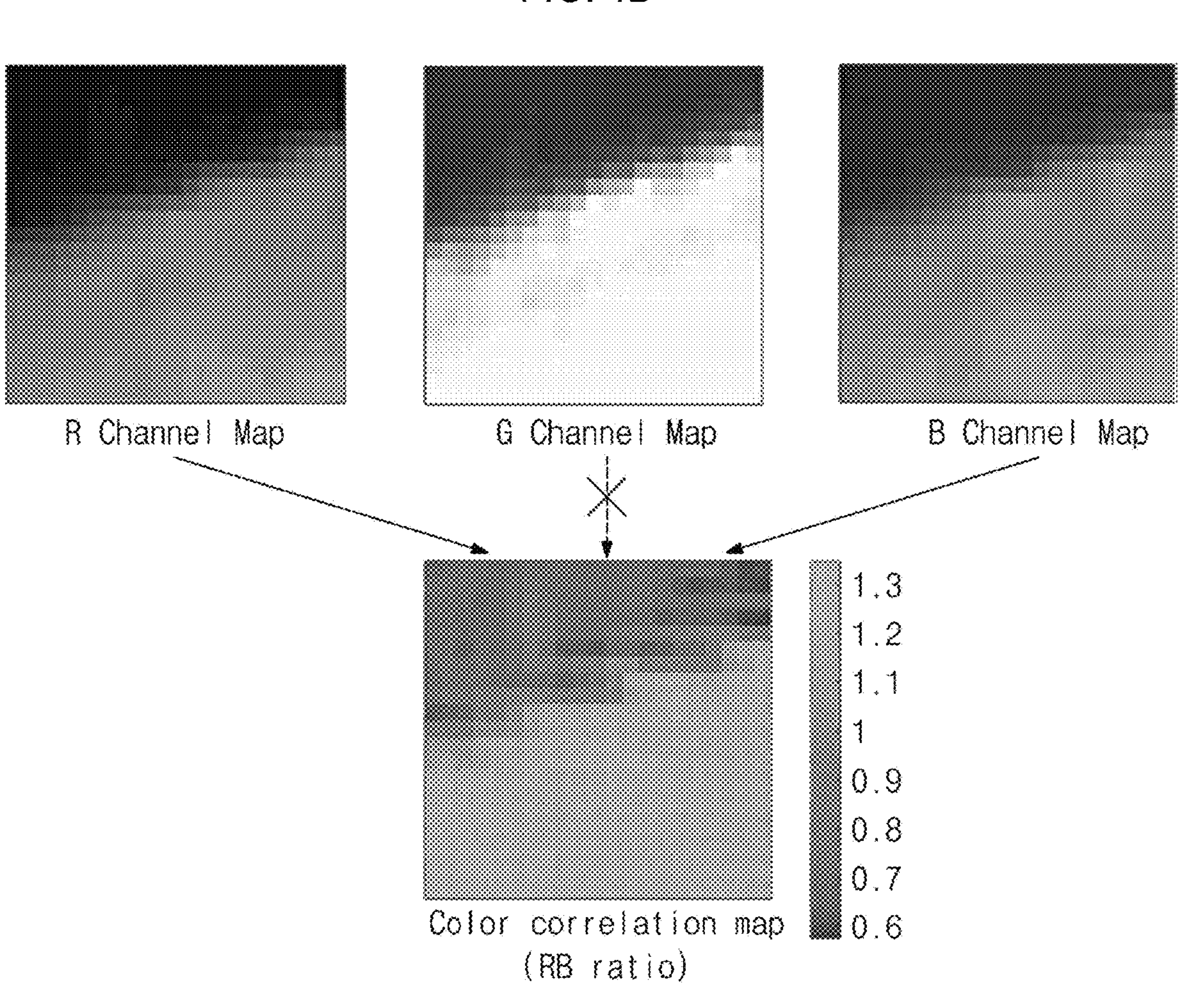

FIGS. 4A and 4B are diagrams that illustrate an operation of the color processing unit 220 of FIG. 2. FIG. 4A illustrates an example of an operation of the color estimation module 221, and FIG. 4B illustrates an example of an operation of the color correlation calculation module 222.

Referring to FIG. 4A, the color estimation module 221 may generate an R channel, a G channel, and a B channel corresponding to each unit pixel using a de-mosaicing method, and thus an R channel map, a G channel map, and a B channel map corresponding to a plurality of unit pixels included in the pixel array 110 may be generated.

For example, when the R channel is generated, the color estimation module 221 may obtain information on the R channel from a unit pixel corresponding to a G filter, and may obtain information on the R channel from a unit pixel corresponding to a B filter. Also, the color estimation module 221 may additionally obtain information on the R channel from a unit pixel corresponding to a neighboring R filter. The color estimation module 221 may generate an R channel based on the obtained information. The color estimation module 221 may generate each of the R channel, the G channel, and the B channel in such a manner described above.

In the case of light irradiated in nature, the intensity of the G channel is relatively strong. Accordingly, the G channel may be mainly saturated, as illustrated in FIG. 3A. For ease of description, hereinafter, it will be assumed that the G channel is mainly saturated to lose a larger amount of information than the R channel and the B channel.

Referring to FIG. 4B, the color correlation calculation module 222 may perform a correlation calculation using an R channel map and a B channel map, other than a G channel map having a large amount of information lost due to saturation. Accordingly, the color correlation calculation module 222 may output a color correlation map, and the color correlation map may include RB ratio information corresponding to each unit pixel. For example, when the RB ratio is "1," it may mean that a ratio of an R channel to a B channel of the corresponding unit pixel is 1 to 1. As the RB ratio increases, a proportion of the R channel in the corresponding unit pixel may increase. As the RB ratio decreases, a proportion of the B channel in the corresponding unit pixel may increase.

Figure 5A:
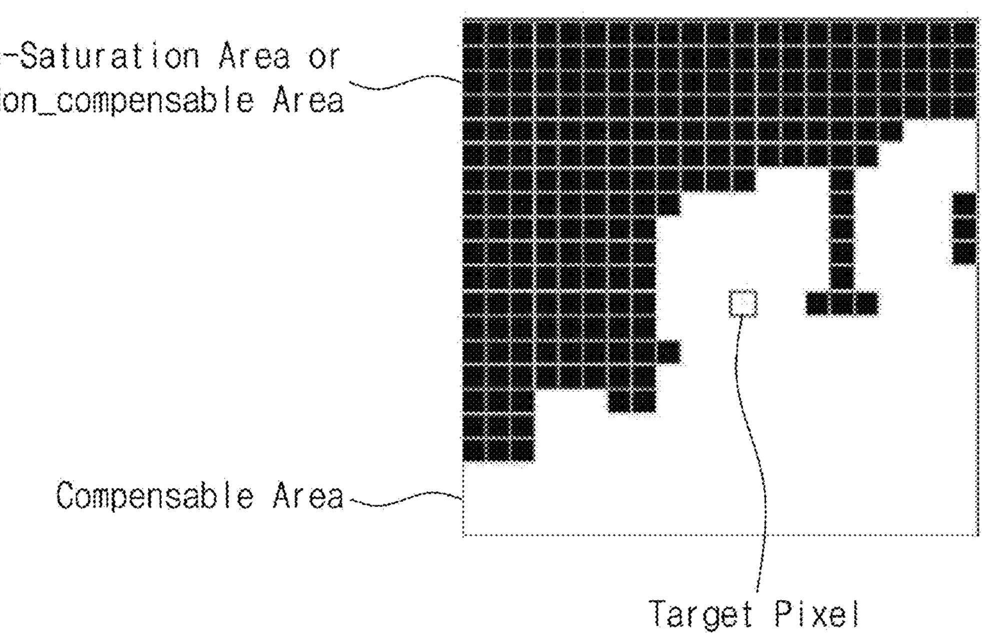
FIGS. 5A to 5E are diagrams that illustrate an operation of a saturation compensation unit of FIG. 2.
Figure 5B:
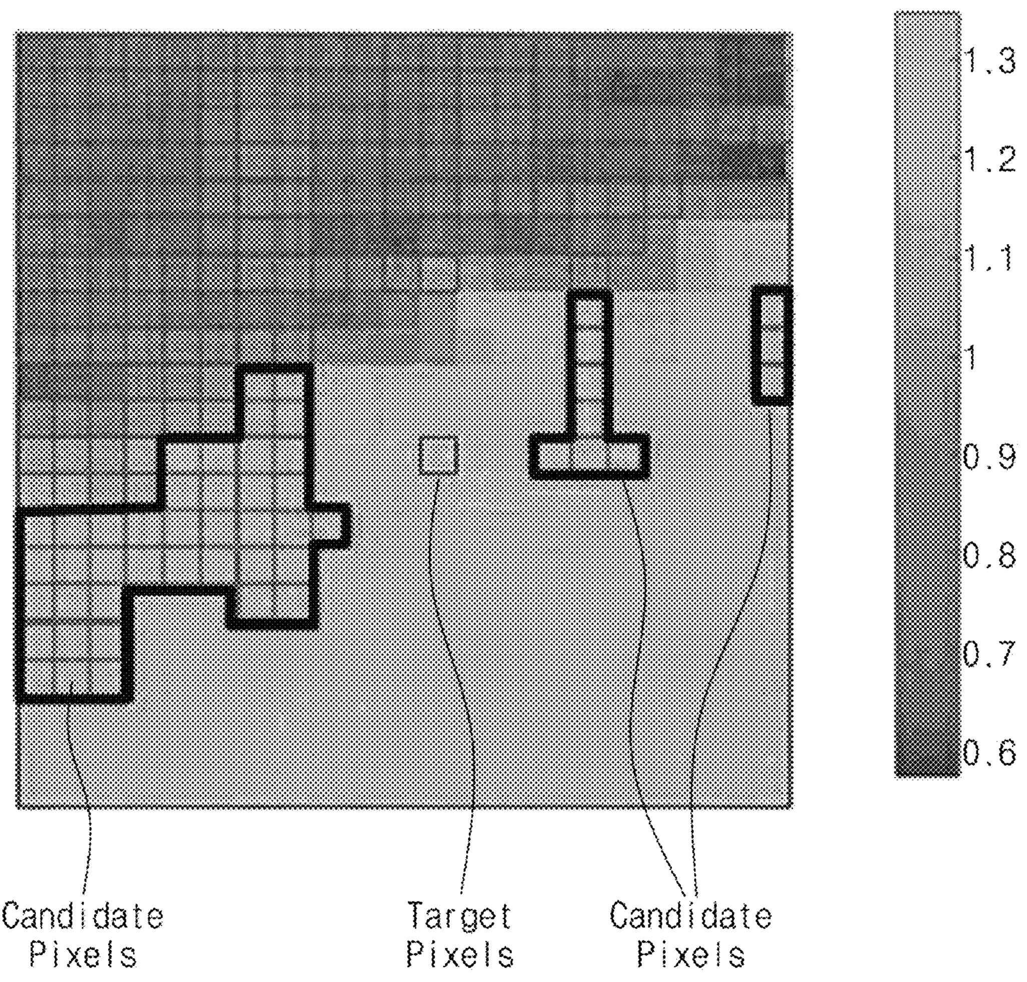
Figure 5C:
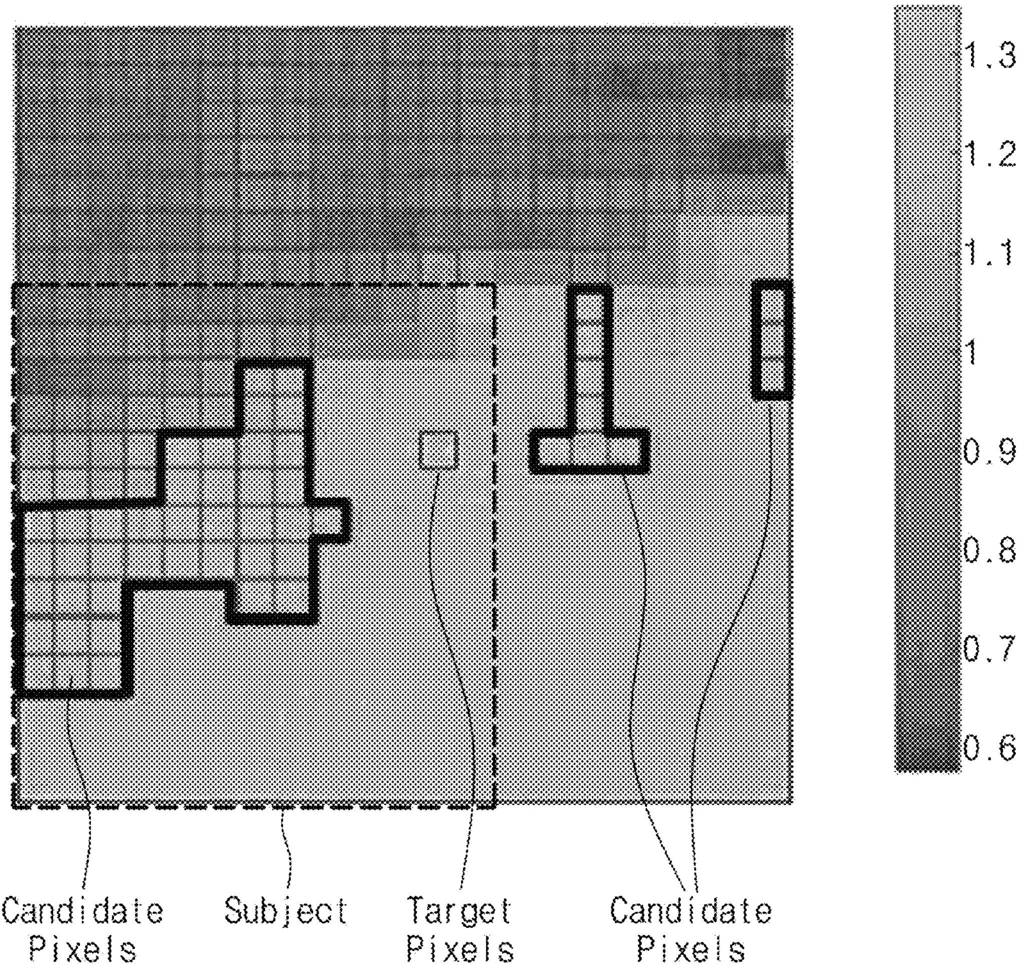
Figure 5D:
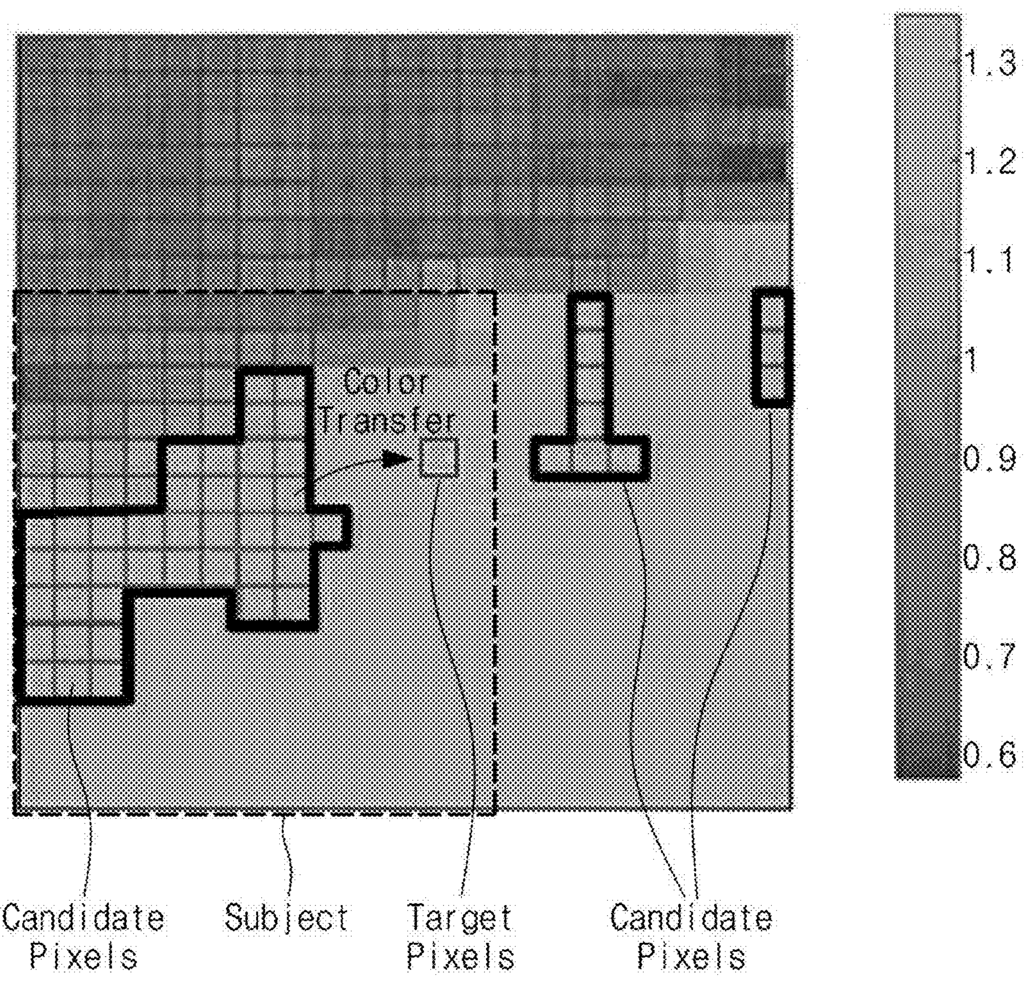
Figure 5E:
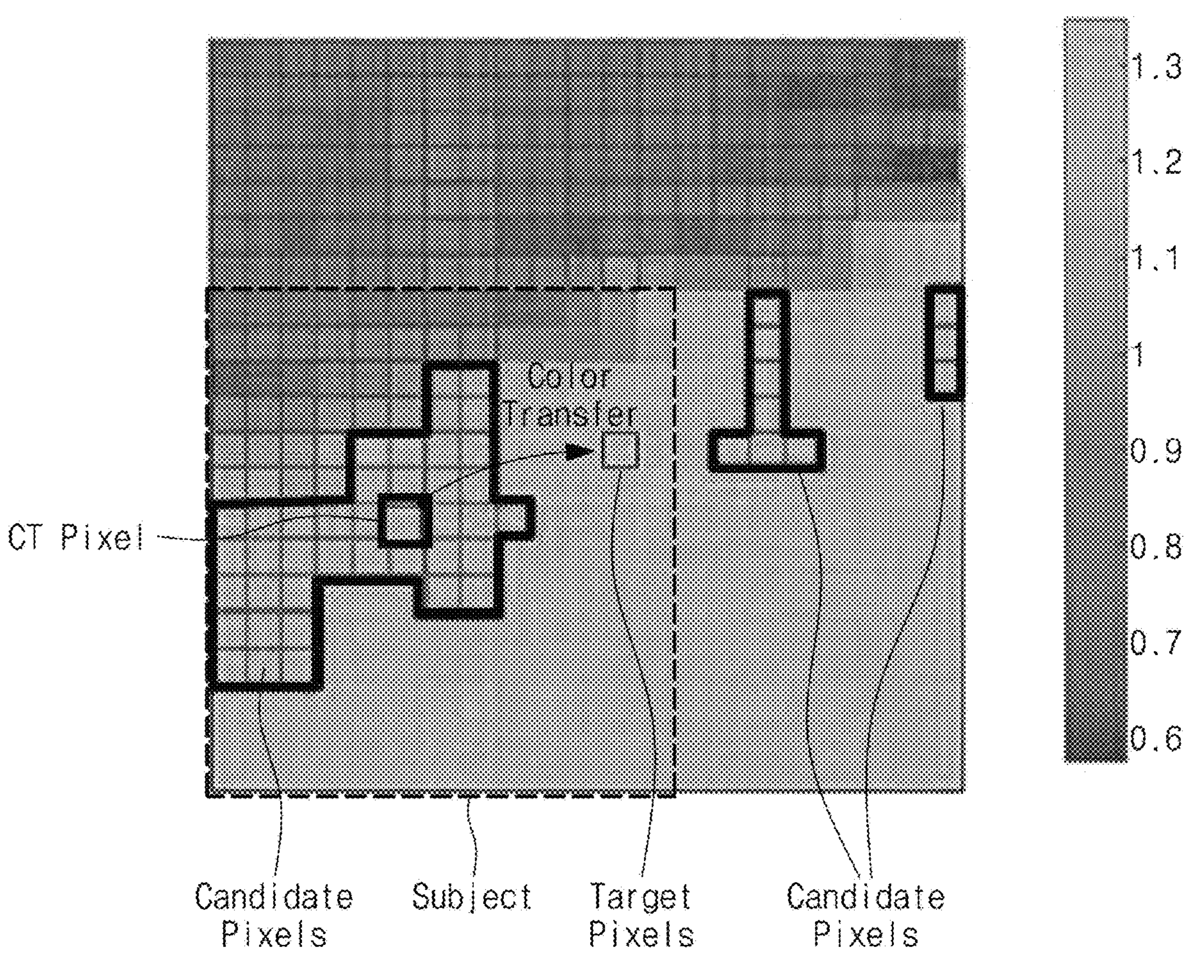

FIGS. 5A and 5E are diagrams that illustrate an operation of the saturation compensation unit 230 of FIG. 2. FIG. 5A illustrates an example in which a target pixel, on which a compensation operation is to be performed, is selected in a flag map received from the saturation detecting unit 210. FIG. 5B illustrates an example in which candidate pixels are selected from a color correlation map received from the color processing unit 220. FIG. 5C illustrates an example in which among candidate pixels, candidate pixels belonging to the same subject are selected. FIGS. 5D and 5E illustrate an example in which information of a target pixel, lost due to saturation, is at least partially recovered based on at least one CT pixel.

Referring to FIG. 5A, the saturation compensation unit 230 may receive a flag map including information on compensable pixels from the saturation detecting unit 210, and may select a target pixel on which a compensation operation is to be performed.

Referring to FIG. 5B, the saturation compensation unit 230 may receive a color correlation map from the color processing unit 220. The saturation compensation unit 230 may identify information on an RB ratio of a target pixel using the color correlation map. The saturation compensation unit 230 may select unit pixels each having an RB ratio similar to that of the target pixel, among non-saturated pixels, as candidate pixels.

Referring to FIG. 5C, when a compensation operation is performed using a pixel belonging to a subject, different from a target pixel, the quality of a color image may be deteriorated due to a false color. Accordingly, the saturation compensation unit 230 may exclude pixels belonging to a subject, different from the target pixel, from candidate pixels.

Referring to FIG. 5D, the saturation compensation unit 230 may select a plurality of candidate pixels as CT pixels and may perform a color-transfer operation using the selected CT pixels.

Referring to FIG. 5E, the saturation compensation unit 230 may select a single candidate pixel, selected from among the plurality of candidate pixels, as a CT pixel and may perform a color-transfer operation using the CT pixel.

The color-transfer operation may be performed based on, for example, information on a channel to be compensated for of a target pixel, information on the other channels of the target pixel, and information on a ratio of a channel to be compensated for in a CT pixel and the other channels.

For ease of description, it will be assumed that the G channel is saturated and a compensation operation is performed on the G channel of the target pixel. In this case, information on R and B channels of the target pixel may be used in a compensation operation. In addition, information on a GR ratio of the CT pixel and information on a GB ratio of CT pixel may be used in the compensation operation. For example, this may be represented by Equation 1 below.

$$G' = \frac{R_{dmsc} * GR \text{ color ratio} + B_{dmsc} * GB \text{ color ratio}}{2} \quad \text{Equation 1}$$

where G' is a G channel compensated for in a target pixel, $R_{dmsc}$ and $B_{dmsc}$ are R and B channels of the target pixel generated by a de-mosaicing method before a compensation operation is performed, and a GR color ratio and a GB color ratio are a GR ratio and a GB ratio of a CT pixel. Information, lost as the target pixel is saturated, may be at least partially recovered through such a color-transfer method to extend a dynamic range.

As described above, the image signal processor 200 according to embodiments of the present disclosure may be configured to recover information of a target pixel, lost due to saturation, through a color-transfer method using a color correlation between a target pixel and a CT pixel. Accordingly, the information of the target pixel, lost due to saturation, may be at least partially recovered and a dynamic range may be extended.

Figure 6:
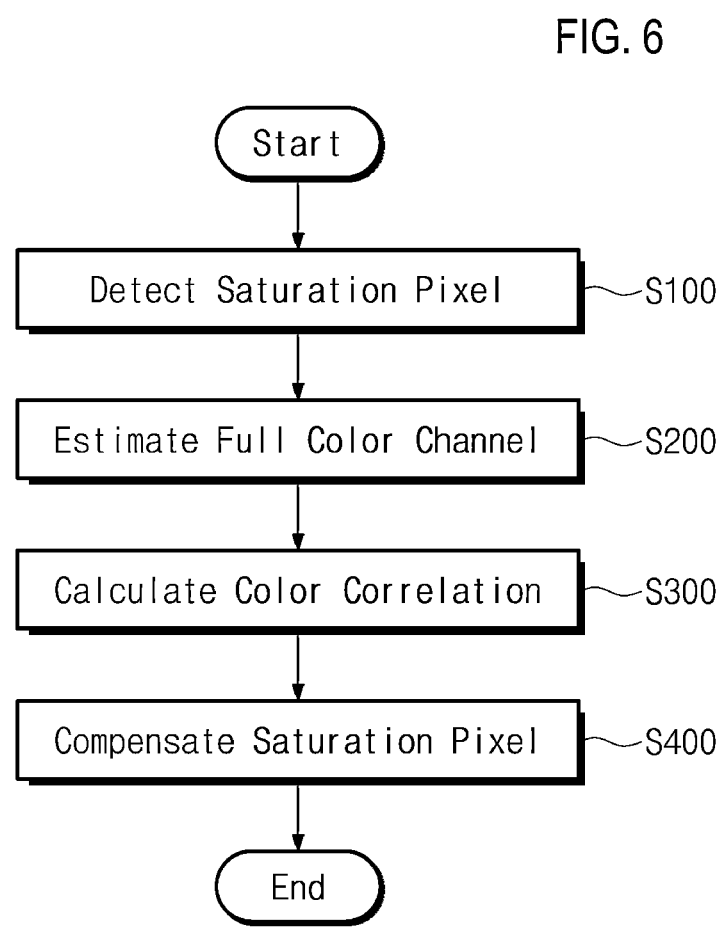

FIG. 6 is a flowchart illustrating an example of operations of the image signal processor 200 of FIG. 2.

In operation S100, an operation of detecting a saturated pixel may be performed. For example, the image signal processor 200 may compare an image data value for each of a plurality of unit pixels included in the pixel array 100 (see FIG. 1) with a saturation threshold value Tsat to identify whether each of the unit pixels is saturated. In addition, the image signal processor 200 may classify the unit pixels as either compensable pixels or non-compensable pixels, based on whether each of the unit pixels is saturated.

In operation S200, an operation of estimating an R channel, a G channel, and a B channel corresponding to each of the unit pixels may be performed. For example, the image signal processor 200 may estimate the R channel, the G channel, and the B channel corresponding to each of the unit pixels using a de-mosaicing method.

In operation S300, a color correlation calculation operation may be performed. For example, the image signal processor 200 may perform a correlation calculation operation using, among the R channel, the G channel, and the B channel, the other two channels other than one channel having a large amount of information lost due to saturation.

In operation S400, a compensation operation may be performed. For example, the image signal processor 200 may select a target pixel, on which a compensation operation is to be performed, among saturated pixels, and may select at least one CT pixel to be used for a color-transfer operation, among non-saturated pixels. In this case, the at least one CT pixel may be selected based on similarity of a color correlation calculation value to that of the target pixel. Information on a target pixel, lost due to saturation, may be at least partially recovered using color information of the at least one CT pixel.

Figure 7:
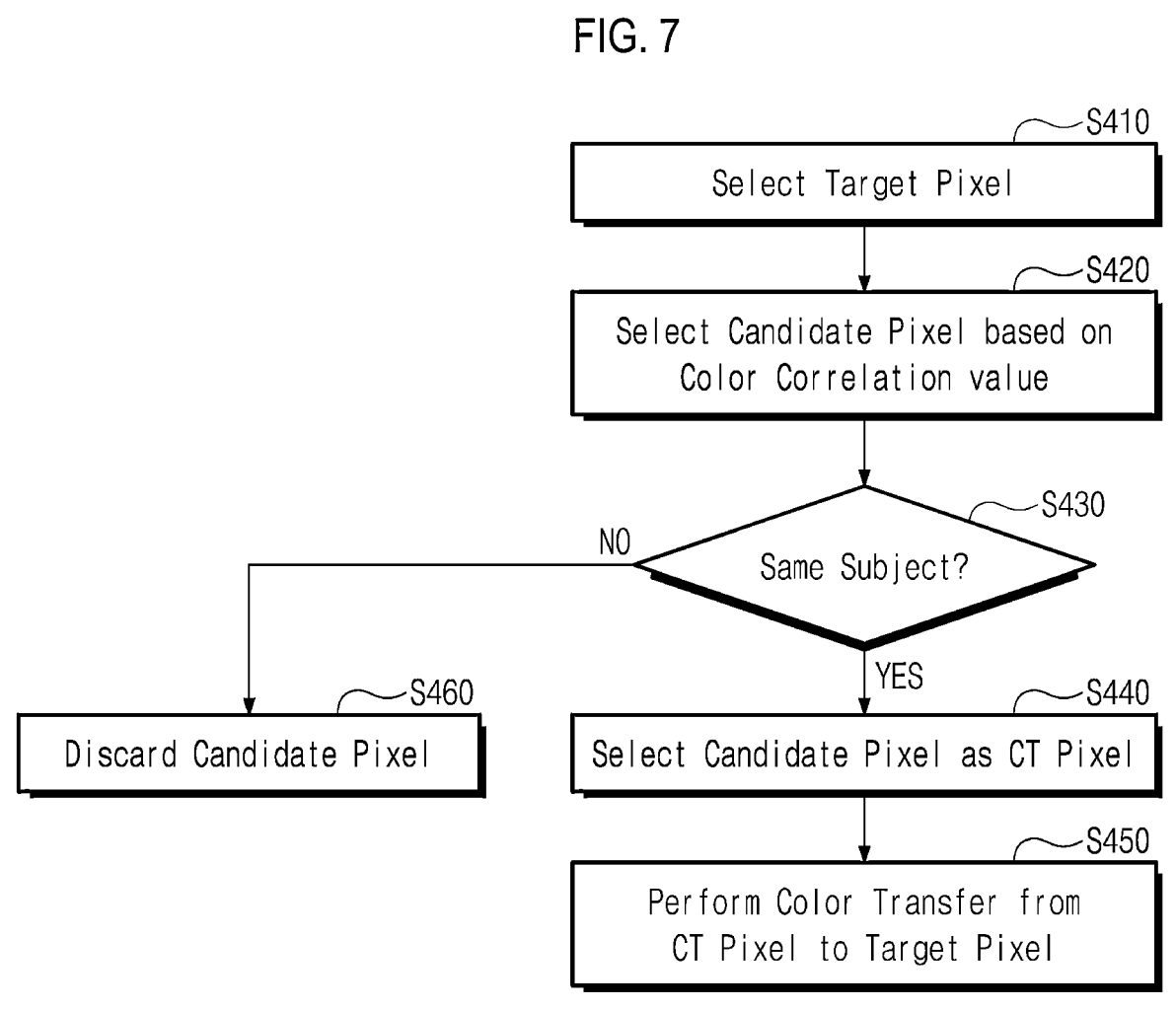

FIG. 7 is a flowchart illustrating an example of the compensation operation of FIG. 6.

In operation S410, a target pixel, on which a compensation operation is to be performed, may be selected from among a plurality of saturated pixels. For example, the image signal processor 200 may select one of the saturated pixels as a target pixel. In this case, among pixels adjacent to the target pixel, at least one pixel may be a non-saturated pixel.

In operation S420, candidate pixels may be selected from non-saturated pixels based on a correlation calculation value for a color. For example, the image signal processor 200 may select candidate pixels from non-saturated pixels based on similarity of color correlation values between the target pixel and the non-saturated pixels.

In operation S430, a determination may be made whether the target pixel and the candidate pixels correspond to the same subject.

In operation S460, when the target pixel and the candidate pixels correspond to different subjects, the candidate pixels may be excluded from CT pixel candidates on which a color-transfer operation is to be performed.

In operation S440, when the target pixel and the candidate pixels correspond to the same subject, the candidate pixels are selected as CT pixels on which a color-transfer operation is to be performed.

In operation S450, a compensation operation may be performed on the target pixel using the CT pixel. For example, the image signal processor 200 may perform a compensation operation using information on channels other than a channel to be compensated for in a target pixel and information on a color ratio between a channel to be compensated for and another channel in the CT pixel.

As described above, information of a target pixel, lost due to saturation, may be at least partially recovered through a color-transfer method using a color correlation between the target pixel and the CT pixel.

The above description provides examples for purposes of illustration, and example embodiments are not limited thereto. Example embodiments may be modified and applied in various ways. Hereinafter, various modified examples and application examples will be described in more detail.

Figure 8:
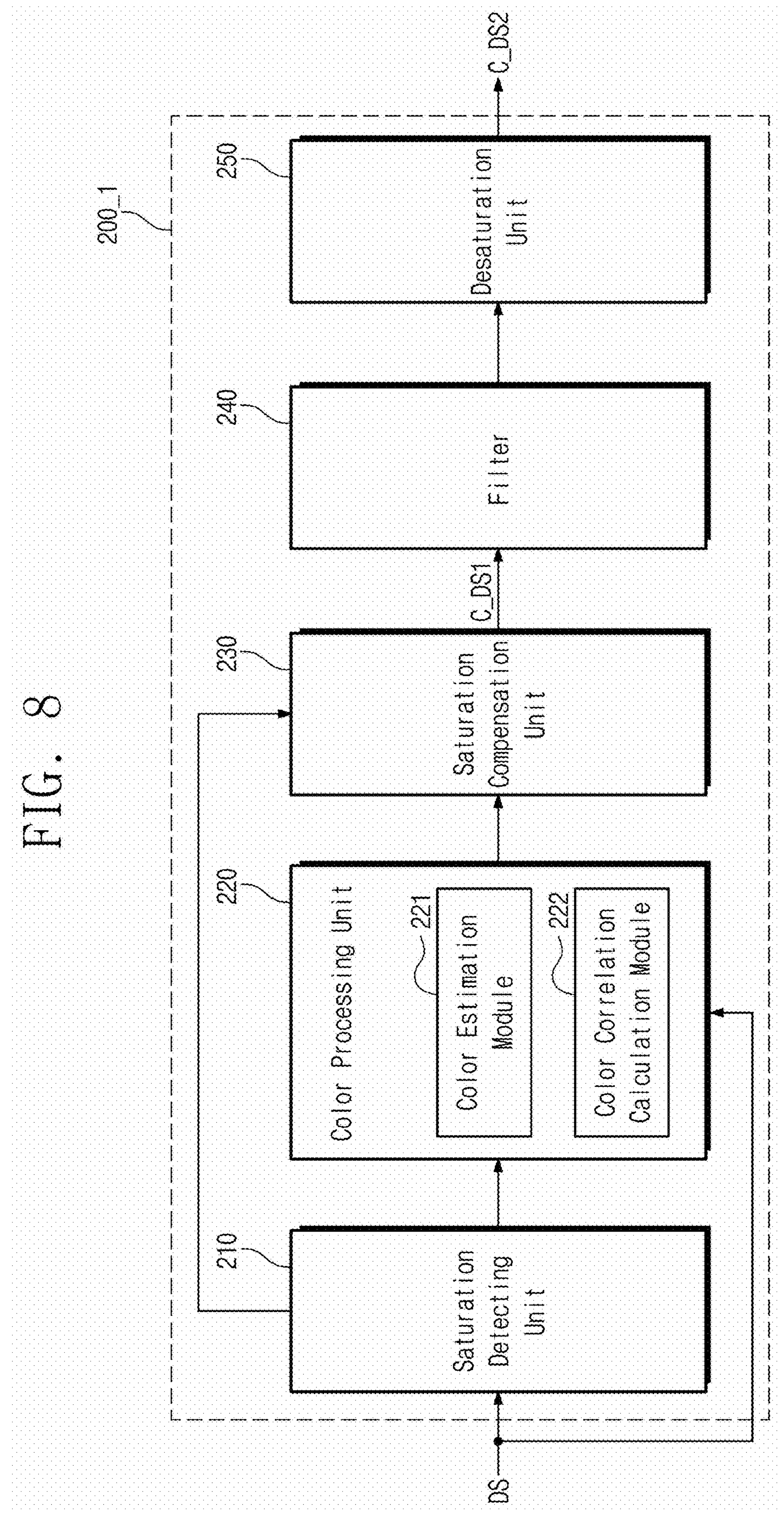
FIG. 8 is a block diagram illustrating another example of the image signal processor of FIG. 1.

FIG. 8 is a block diagram illustrating another example of the image signal processor 200 of FIG. 1. An image signal processor 200_1 of FIG. 8 is similar to the image signal processor 200 of FIG. 2. Accordingly, the same or similar components are represented by the same or similar reference numerals, and redundant descriptions will be omitted below.

Referring to FIG. 8, the image signal processor 200_1 may include a saturation detecting unit 210, a color processing unit 220, a saturation compensation unit 230, a filter 240, and a desaturation unit 250.

The filter 240 may be configured to receive a recovered digital signal C_DS1 from the saturation compensation unit 230 and may be configured to perform a filtering operation to remove noise from the recovered digital signal C_DS1. For example, the filter 240 may be a bilateral filter that smooths an image while conserving edges in the image. In a certain case, color values of saturated pixels and adjacent pixels may be detected to be smaller than actual values. The bilateral filter may mitigate such an insufficient detection of a saturated area.

The desaturation unit 250 may be configured to perform a correction operation on compensated target pixels and adjacent pixels. For example, the desaturation unit 250 may perform a correction operation on pixels adjacent to compensated target pixels to correct values of an R channel, a G channel, and a B channel. A difference in color correlation calculation values between a compensated pixel and adjacent pixels may be reduced through such a correction operation.

Figure 9:
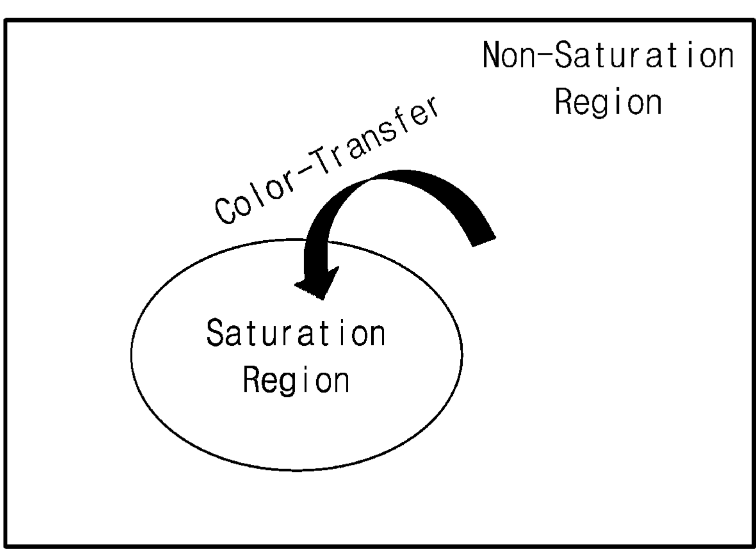
Figure 10:
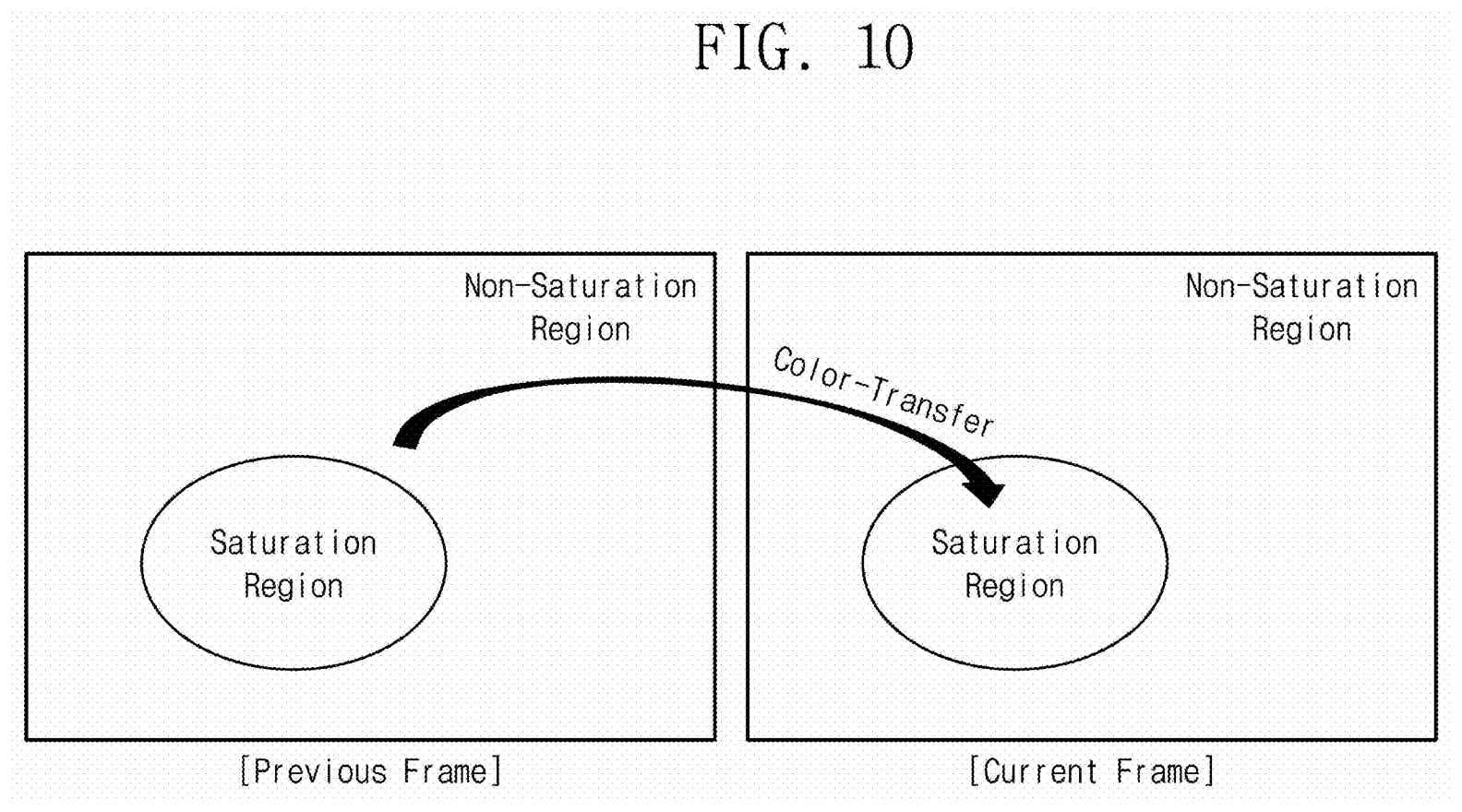
Figure 11:
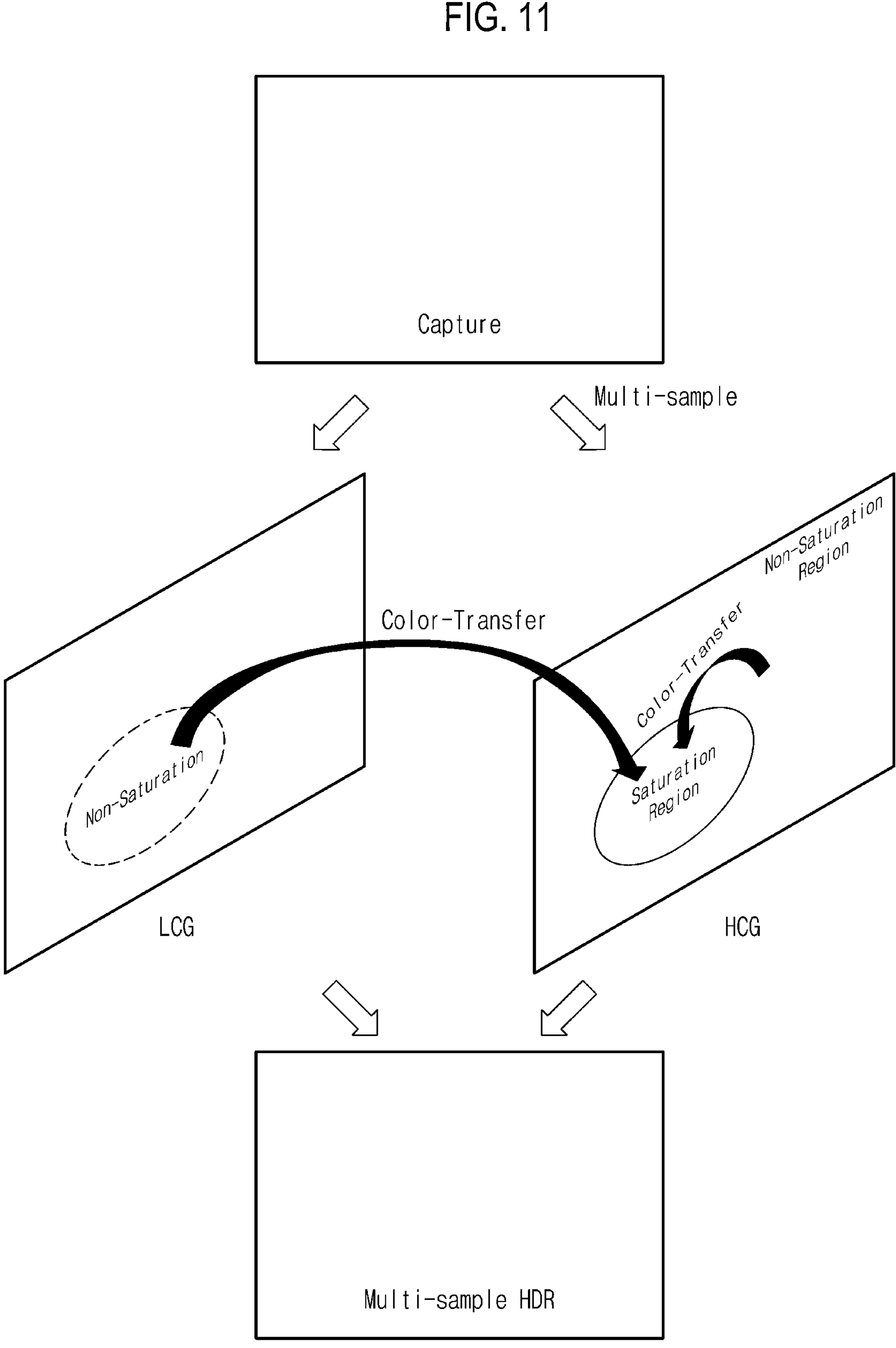

FIGS. 9 to 11 are diagrams illustrating an example in which the image signal processor 200 according to an example embodiment is applied to a single frame, multiple frames, and a multi-sample high dynamic range (HDR).

Referring to FIG. 9, the image signal processor 200 according to an example embodiment may perform a lost information recovery operation on image data of a single frame through a color-transfer method. For example, the image signal processor 200 may divide a single frame into a saturated area, including saturated pixels, and a non-saturated area including non-saturated pixels, and may at least partially recover information of a target pixel, lost due to saturation, using a selected CT pixel among the non-saturated pixels.

Referring to FIG. 10, the image signal processor 200 according to an example embodiment may perform a recovery operation using a color-transfer method in a previous frame, and may also perform a recovery operation using a color-transfer method in a current frame. In this case, the color correlation map used in the previous frame may be reused in the current frame. Accordingly, time required to perform a correlation calculation operation may be reduced, and information of the target pixel, lost due to saturation, may be at least partially recovered faster.

Referring to FIG. 11, the image signal processor 200 according to an example embodiment may also be applied to a high dynamic range (HDR) method. For example, it will be assumed that a dual conversion gain (DCG) operation of synthesizing an image in a low conversion gain (LCG) mode and an image in a high conversion gain (HCG) mode and outputting a final image is performed. In this case, loss of information of unit pixels, caused by saturation, may mainly occur in the HCG mode, and unit pixels may hardly be saturated in the LCG mode. In this case, non-saturated pixels in LCG mode may be selected as CT pixels, and saturated pixels in HCG mode may be selected as target pixels. The image signal processor 200 may at least partially recover information, lost due to saturation, in the HCG mode based on color similarity between a CT pixel selected in the LCG mode and a saturated pixel selected in the HCG mode. As described above, the image signal processor 200 according to an example embodiment may be variously applied and utilized.

Figure 12:
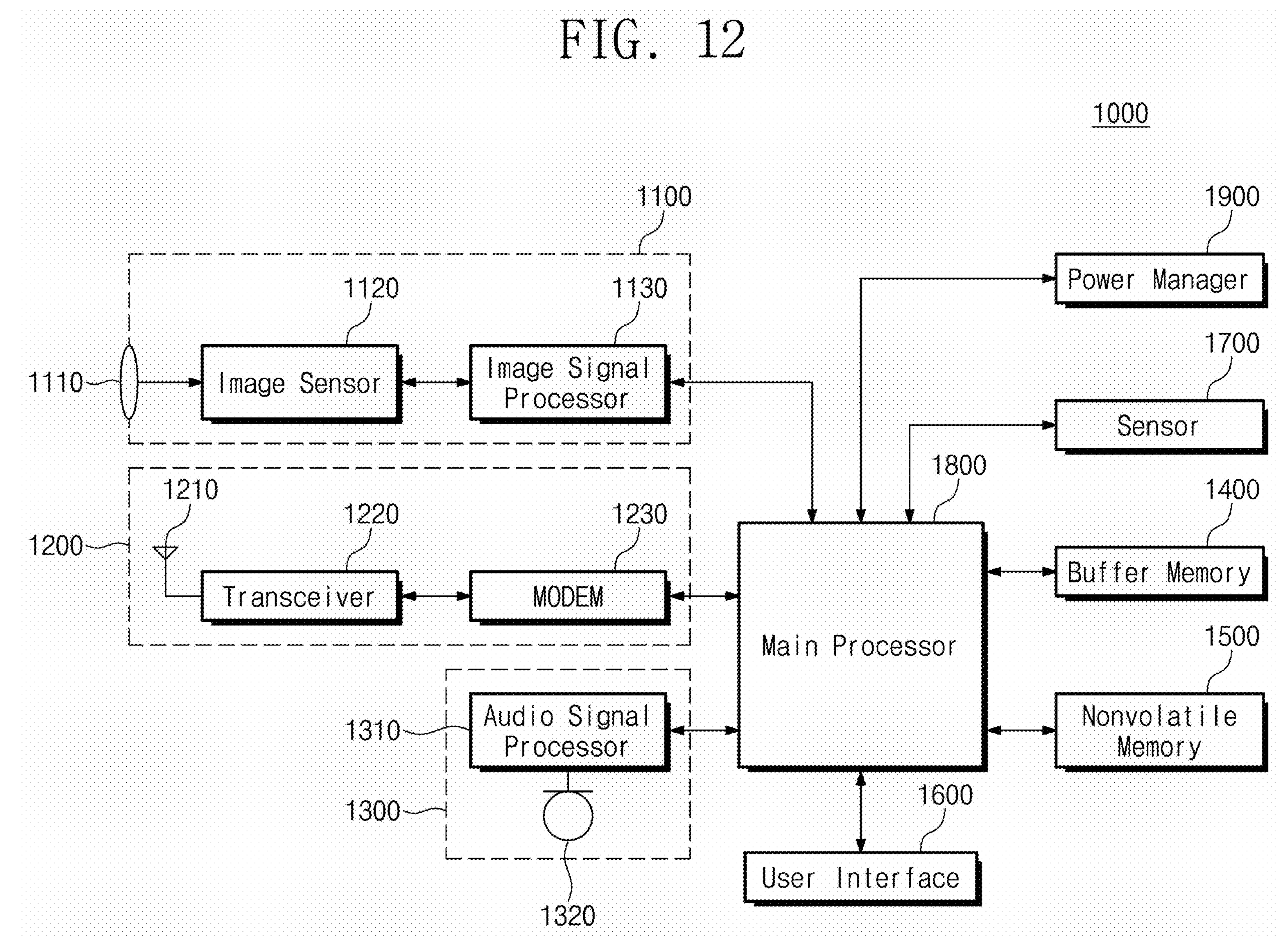
FIG. 12 is a diagram illustrating an example of an electronic device in which the image processing device of FIG. 1 is included.

FIG. 12 is a diagram illustrating an example of an electronic device 1000 to which the image processing device 1100 of FIG. 1 is applied or is included. However, in some embodiments, the image signal processor 1130 may be provided as a part of an image sensor 1120, provided on a circuit or chip independent of an image processing device 1100, and/or provided as a part of a main processor 1800.

The image sensor 1120 may be configured to capture an image through the lens 1110, and may be configured to output a digital signal for the captured image.

The image signal processor 1130 may be configured to perform various processes on signals output from the image sensor 1120. For example, the image signal processor 1130 according to an example embodiment may at least partially recover information of a target pixel, lost due to saturation, based on color information of a non-saturated pixel using a color-transfer method. The recovered digital signal, output by the image signal processor 1130, may be output to the main processor 1800.

The communication block 1200 may be configured to exchange signals with an external device/system through an antenna 1210. A transceiver 1220 and a modulator/demodulator (MODEM) 1230 of the communication block 1200 may be configured to process signals exchanged with the external device/system, based one or more of a variety of different wireless communication protocols, such as, but not limited to, long term evolution (LTE), worldwide interoperability for microwave access (WiMax), global system for mobile communication (GSM), code division multiple access (CDMA), Bluetooth, near field communication (NFC), wireless fidelity (Wi-Fi), and/or radio frequency identification (RFID). In some embodiments, the communication block 1200 may be provided as a part of the main processor 1800.

An audio processing block 1300 may be configured to process sound information using an audio signal processor 1310. The audio processing block 1300 may be configured to receive an audio input through a microphone 1320 or may output an audio signal through a speaker 1330.

A buffer memory 1400 may be configured to temporarily store data (for example, data processed or to be processed by the main processor 1800) used for an operation of the electronic device 1000. As an example, the buffer memory 1400 may include a volatile/nonvolatile memory, such as a static random-access memory (SRAM), a dynamic RAM (DRAM), a synchronous DRAM (SDRAM), a phase-change RAM (PRAM), a magneto-resistive RAM (MRAM), a resistive RAM (ReRAM), or a ferroelectric RAM (FRAM).

As an example, an image captured by the image processing block 1100 may be stored in the buffer memory 1400. The main processor 1800 may be configured to perform HDR processing on the image stored in the buffer memory 1400.

A nonvolatile memory 1500 may be configured to store data regardless of whether power is supplied. As an example, the nonvolatile memory 1500 may include a nonvolatile memory, such as a flash memory, a PRAM, an MRAM, a ReRAM, or a FRAM. As an example, the nonvolatile memory 1500 may include a removable memory, such as a hard disk drive (HDD), a solid-state drive (SSD), a secure digital (SD) card, universal flash storage (UFS), and/or an embedded memory such as an embedded multimedia card (eMMC).

A user interface 1600 may be configured to enable communication between a user and the electronic device 1000. As an example, the user interface 1600 may include an input interface, such as a keypad, a button, a touchscreen, a touchpad, a vision sensor, a motion sensor, or a gyroscope sensor. As an example, the user interface 1600 may further include an output interface, such as an organic LED (OLED) display device, an active matrix OLED (AMOLED) display device, an LED display device, a liquid crystal display (LCD) device, a motor, or an LED lamp.

A sensor 1700 may be configured to sense various types of physical energy provided from an external entity of the electronic device 1000. As an example, the sensor 1700 may sense a transfer medium of physical energy, such as temperature, a voice, or a light. As an example, the sensor 1700 may sense illuminance and may transmit data, indicating the sensed illuminance, to the main processor 1800.

The main processor 1800 may be configured to perform various operations to control the overall operation of the electronic device 1000. The main processor 1800 may be implemented as a general-purpose processor, a specific-purpose processor, or an application processor, and may include one or more processor cores. The main processor 1800 may be configured to control the image processing block 1100 to obtain image data associated with an object outside the electronic device 1000. As an example, the main processor 1800 may be configured to generate an HDR image based on an image associated with a low conversion gain and an image associated with a high conversion gain provided from the image processing block 1100.

A power manager 1900 may be configured to appropriately convert power received from a battery or an external power supply. The power manager 1900 may supply the converted power to components of the electronic device 1000.

As described above, an image signal processor according to example embodiments may at least partially recover information, lost due to saturation, through a color-transfer method using a correlation between colors. Accordingly, a dynamic range may be extended.

While example embodiments have been shown and described above, it will be apparent to those skilled in the art that modifications and variations could be made without departing from the scope of the present inventive concept as defined by the appended claims.

What is claimed is:

1. An image signal processor configured to receive a digital signal from an image sensor, the image signal processor comprising:

a saturation detecting unit configured to classify each of a plurality of pixels, corresponding to the digital signal, as either a saturated pixel or a non-saturated pixel and to select a compensable pixel among the saturated pixels;

a color processing unit configured to estimate channel values for each color for each of the plurality of pixels corresponding to the digital signal and to perform a correlation calculation between the channel values for each color, wherein the color processing unit comprises:

a color estimation module configured to estimate values of a plurality of color channels for each of a plurality of pixels; and a color correlation calculation module configured to output a color correlation map through a correlation calculation between two selected color channels among the plurality of color channels; and a saturation compensation unit configured to select at least one color-transfer pixel, among the non-saturated pixels, based on the correlation calculation value between the channel values for each color and to perform a compensation operation on the compensable pixel based on the at least one color-transfer pixel, wherein the saturation compensation unit is configured to:

check a correlation calculation value, corresponding to the compensable pixel, and a correlation calculation value, corresponding to each of the non-saturated pixels, based on the color correlation map; and select the at least one color-transfer pixel, among the non-saturated pixels, based on similarity between the correlation calculation value of the compensable pixel and the correlation calculation values of the non-saturated pixels.

2. The image signal processor of claim 1, wherein the saturation detecting unit is configured to determine whether each of the plurality of pixels is saturated based on a result of comparing an image data value for each of the plurality of pixels with a saturation threshold value.

3. The image signal processor of claim 2, wherein each of the plurality of pixels comprises a plurality of channels, and the saturation detecting unit is configured to determine a pixel corresponding to at least one of the plurality of channels as a saturated pixel when a data value of the at least one channel is greater than the saturation threshold value.

4. The image signal processor of claim 2, wherein the saturation detecting unit is configured to select the compensable pixel, among the saturated pixels, based on whether a non-saturated pixel is included in a kernel having a predetermined size.

5. The image signal processor of claim 1, wherein a number of saturated pixels, corresponding to the two selected channels used to form the color correlation map, is less than a number of saturated pixels corresponding to an unselected channel, not used to form the color correlation map.

6. The image signal processor of claim 1, wherein the saturation compensation unit is configured to:

select first candidate pixels, among the non-saturated pixels, based on the similarity between the correlation calculation values; and select pixels corresponding to a same subject as the compensable pixel, among the first candidate first pixels, as second candidate pixels.

7. The image signal processor of claim 1, wherein the compensable pixel and the at least one non-saturated pixel comprise a first channel, a second channel and a third channel, and the saturation compensation unit is configured to perform a compensation operation on the compensable pixel based on information on the first channel corresponding to the compensable pixel, ratio information between the first channel corresponding to the at least one color-transfer pixel and the second channel, and ratio information between the first channel corresponding to the at least one color-transfer pixel and the third channel.

8. The image signal processor of claim 1, wherein the saturation compensation unit is configured to perform a compensation operation on the compensable pixel within a single frame.

9. The image signal processor of claim 1, wherein the saturation compensation unit is configured to perform a compensation operation on a first pixel, selected from among the saturated pixels in a previous frame, and performs a compensation operation on a second pixel selected from among the saturation pixels in a current frame, and a color correlation map, used in a compensation operation on the first pixel, and a color correlation map, used in a compensation operation on the second pixel, are the same.

10. The image signal processor of claim 1, wherein the saturation compensation unit is configured to select the at least one color-transfer pixel from among the non-saturated pixels in a low conversion gain (LCG) mode, and is configured to select the compensable pixel from among the saturated pixels in a high conversion gain (HCG) mode.

11. The image signal processor of claim 10, wherein a color correlation map, used to select the at least one color-transfer pixel in the LCG mode, and a color correlation map, used to select the compensable pixel in the HCG mode, are the same.

12. A method of operating an image signal processor, the method comprising:

comparing an image data value for each of a plurality of unit pixels with a saturation threshold value to detect saturated pixels among the plurality of unit pixels;

estimating channels for each of the plurality of unit pixels;

performing a correlation calculation on some channels selected from among channels for each of the plurality of unit pixels; and selecting at least one color-transfer pixel from among non-saturated pixels of the plurality of unit pixels based on a result value of the correlation calculation, and performing a compensation operation on a target pixel of the plurality of unit pixels using the at least one color-transfer pixel, wherein performing the compensation operation on the target pixel comprises performing the compensation operation on a first pixel, selected from among the saturated pixels in a previous frame, and performing a compensation operation on a second pixel selected from among the saturation pixels, in a current frame, wherein a color correlation map, used in the compensation operation on the first pixel, and a color correlation map, used in the compensation operation on the second pixel, are the same.

13. The method of claim 12, wherein the target pixel is selected from among the saturated pixels, and at least one pixel, among unit pixels adjacent to the target pixel, is a non-saturated pixel.

14. The method of claim 12, wherein the performing the compensation operation comprises:

select first candidate pixels from among the non-saturated pixels, based on similarity between a correlation calculation value corresponding to the target pixel and correlation calculation values for the non-saturated pixels;

selecting pixels corresponding to a same subject as the target pixel, among the first candidate pixels, as second candidate pixels; and selecting the at least one color-transfer pixel from among the second candidate pixels.

15. The method of claim 12, wherein the target pixel and the at least one color-transfer pixel comprise a first channel, a second channel and a third channel, and the compensation operation is performed based on information on the first channel corresponding to the target pixel, ratio information between the first channel corresponding to the at least one color-transfer pixel and the second channel, and ratio information between the first channel corresponding to the at least one color-transfer pixel and the third channel.

16. The method of claim 15, wherein the first channel, corresponding to the target pixel, is in a saturated state.

17. An electronic device including an image sensor, the electronic device comprising:

a saturation detecting unit configured to classify each of a plurality of pixels, corresponding to a digital signal output from the image sensor, as either a saturated pixel or a non-saturated pixel and to select a compensable pixel from among the saturated pixels;

a color processing unit configured to estimate channel values for each color for each of a plurality of pixels and to perform a correlation calculation between the channel values for each color; and a saturation compensation unit configured to select at least one color-transfer pixel from among the non-saturated pixels based on the correlation calculation value between the channel values for each color and to perform a compensation operation on the compensable pixel based on the at least one color-transfer pixel, wherein:

the saturation compensation unit is configured to select the at least one color-transfer pixel from among the non-saturated pixels in a low conversion gain (LCG) mode and is configured to select the compensable pixel from among the saturated pixels in a high conversion gain (HCG) mode, and correlation calculation values between the channel values for each color used in the LCG mode are the same as correlation calculation values between the channel values for each color used in the HCG mode.

18. The electronic device of claim 17, wherein the saturation detecting unit is configured to determine whether each of the plurality of pixels is saturated based on a result of comparing an image data value for each of the plurality of pixels with a saturation threshold value.

19. The electronic device of claim 18, wherein each of the plurality of pixels comprises a plurality of channels, and the saturation detecting unit is configured to determine a pixel corresponding to at least one of the plurality of channels as a saturated pixel when a data value of the at least one channel is greater than the saturation threshold value.

20. The electronic device of claim 18, wherein the saturation detecting unit is configured to select the compensable pixel, among the saturated pixels, based on whether a non-saturated pixel is included in a kernel having a predetermined size.

* * * * *